United States Patent [19]
Krom

[11] 3,851,543
[45] Dec. 3, 1974

[54] ADJUSTABLE STEERING COLUMN

[75] Inventor: Lynn C. Krom, Saginaw, Mich.

[73] Assignee: General Motors Corporation, Detroit, Mich.

[22] Filed: May 10, 1973

[21] Appl. No.: 359,002

[52] U.S. Cl. .................. 74/493, 74/527, 188/67, 403/59, 403/107, 403/118
[51] Int. Cl. .................. B62d 1/18, G05g 5/06
[58] Field of Search ............... 74/493, 527; 188/67; 403/59, 106, 107, 110, 118

[56] References Cited
UNITED STATES PATENTS

| | | | |
|---|---|---|---|
| 3,157,416 | 11/1964 | Sandbakken | 74/493 X |
| 3,167,971 | 2/1965 | Zeigler | 74/493 |
| 3,224,800 | 12/1965 | Fisher | 403/118 |
| 3,245,282 | 4/1966 | Kimberlin | 74/493 |
| 3,252,350 | 5/1966 | Zeigler | 74/493 |
| 3,310,993 | 3/1967 | Kimberlin et al. | 74/493 |

Primary Examiner—Allan D. Herrmann
Attorney, Agent, or Firm—D. L. Ellis

[57] ABSTRACT

An adjustable steering column including an upper section tiltable with respect to a lower section to any selected one of a very large number of finely graduated positions, such selected position being held by a latch including a toothed rod and a tubular collet receiving the rod and each being pivotally attached to one of the column sections, so that during selected adjustment of the upper section the rod and collet telescope. A toothed conformation on the collet normally radially contracts into latching engagement with the toothed rod to hold the selected position, and release of the latch is effected by radial expansion of the toothed collet conformation to permit the aforementioned telescoping.

3 Claims, 8 Drawing Figures

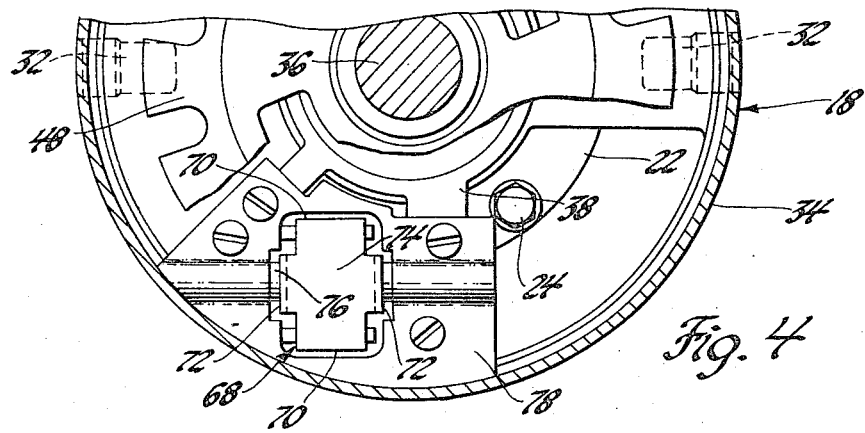
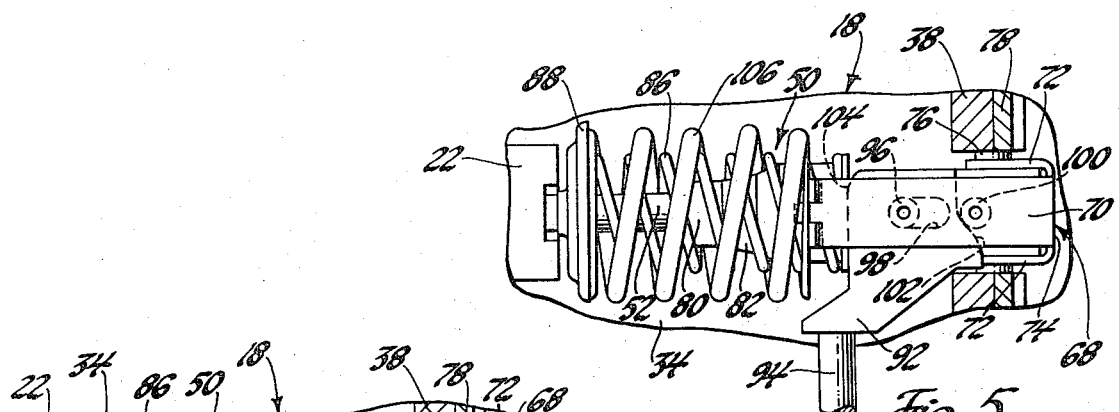
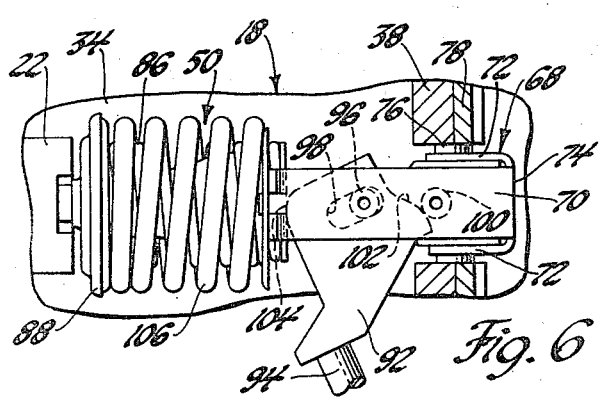
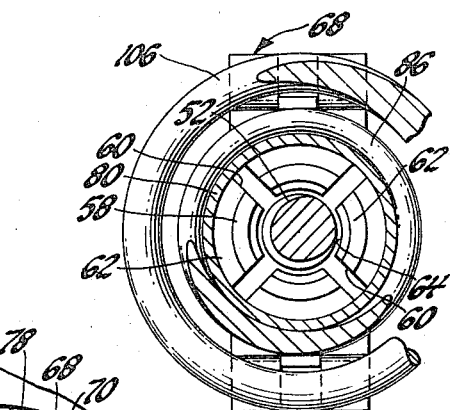
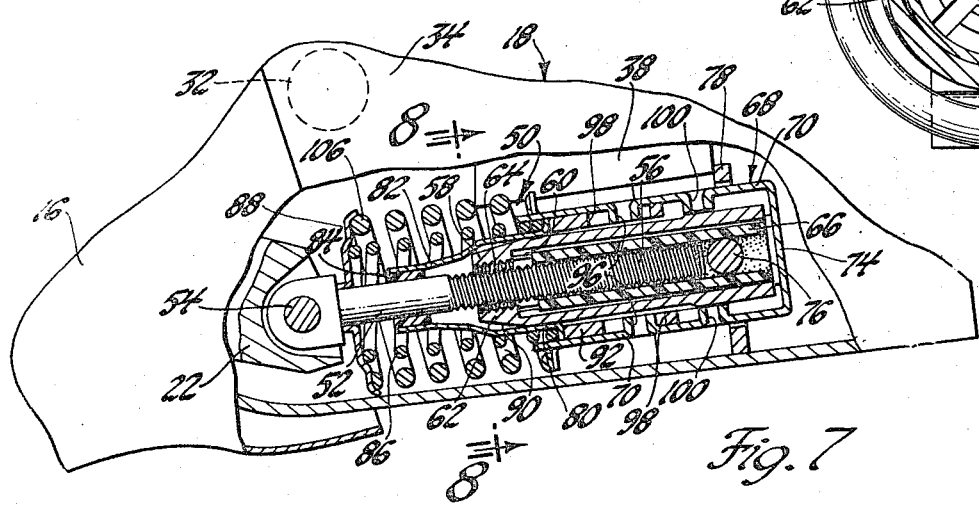

ADJUSTABLE STEERING COLUMN

This invention relates to adjustable steering columns for automotive vehicles and the like and more particularly to adjustment latching arrangements therefor.

In automotive vehicle adjustable steering columns, and in other arts, it is desirable to provide ajustability of the moving portions of the column to a large number of positions within a finite range of adjustment, and also provide positive and sure locking of a selected position and further to achieve both functions with a simplicity and economy of parts. The aforementioned objectives can be antagonistic and a common result has been to provide an adjustable column with a limited number of selectable positions over an adjustment range of substantial expanse, instead of a finely adjustable large number of selectable positions.

The primary feature of this invention is that it provides an adjustable column assembly for vehicles and the like wherein a very large number of selectable positions is provided within such range of adjustment yet the locking of a selected position is quite positive and sure and the arrangement of parts is relatively simple.

A further feature of the invention is that the foregoing is accomplished through the use of a latch structure for the adjustability apparatus in the column including a toothed rod mounted to one of the column sections and a collet attached to the other section and telescopically receiving the rod such that a toothed conformation on the collet is expandable and contractable with respect to the rod to permit free telescoping therebetween and finely adjustable movement of the adjustable column section when the toothed conformation is expanded, and positive firm locking of the selected position of such section when the toothed conformation is contracted into engagement with the rod to prevent such telescoping.

Yet another feature of the invention is in the economical and simple arrangement of parts permitting selective expansion and contraction of the collet relative to the teeth on the rod and including, in one embodiment, a taper surface and spring biased actuating cone for normally contracting the collet tooth conformation on the rod and a manual actuating lever operable to effect expansion of the tooth conformation against such spring bias when column adjustment is desired.

Other features of the invention reside in further economical and simple arrangement of parts including nested coil springs for the aforementioned latching bias and also bias on the adjustable column section in one direction, cam type motion conversion between the manual operating lever and a transversely oriented collect contracting cone or the like, and more, as will be seen in the following detailed description.

These and other features of the invention will be readily apparent from the following specification and from the drawings wherein:

FIG. 4 is an enlarged sectional view taken generally along the planes indicated by lines 4—4 of FIG. 1;

FIG. 5 is a view illustrating the latch structure in a latched condition;

FIG. 6 is a view similar to FIG. 5 illustrating the latch structure in an unlatched condition;

FIG. 7 is a view similar to FIG. 3 with the parts in the condition of FIG. 6; and FIG. 8 is a sectional view taken generally along the lines 8—8 of FIG. 7.

Figure 1:
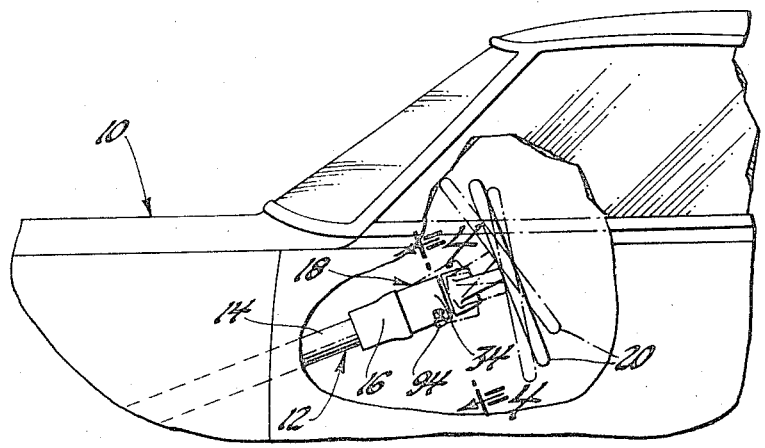
FIG. 1 is a fragmentary partially broken away side elevational view of an automotive vehicle including an adjustable steering column according to this invention.

Referring now particularly to FIG. 1 of the drawings, the same illustrates a vehicle body 10 including within its passenger compartment a steering column including a fixed lower section 12 including the usual steering column mast jacket or support tube 14 over which latter is rotatably received a shift bowl 16 which may carry a conventional shift hand lever for rotation of the shift bowl to control the vehicle transmission range. An upper or tiltable column section 18 is movably mounted on the lower section 12 for tiltable adjustment of a steering wheel 20 which is rotatably carried by upper section 18, the range of adjustment being shown in the two indicated broken line positions of wheel 20.

Figure 2:
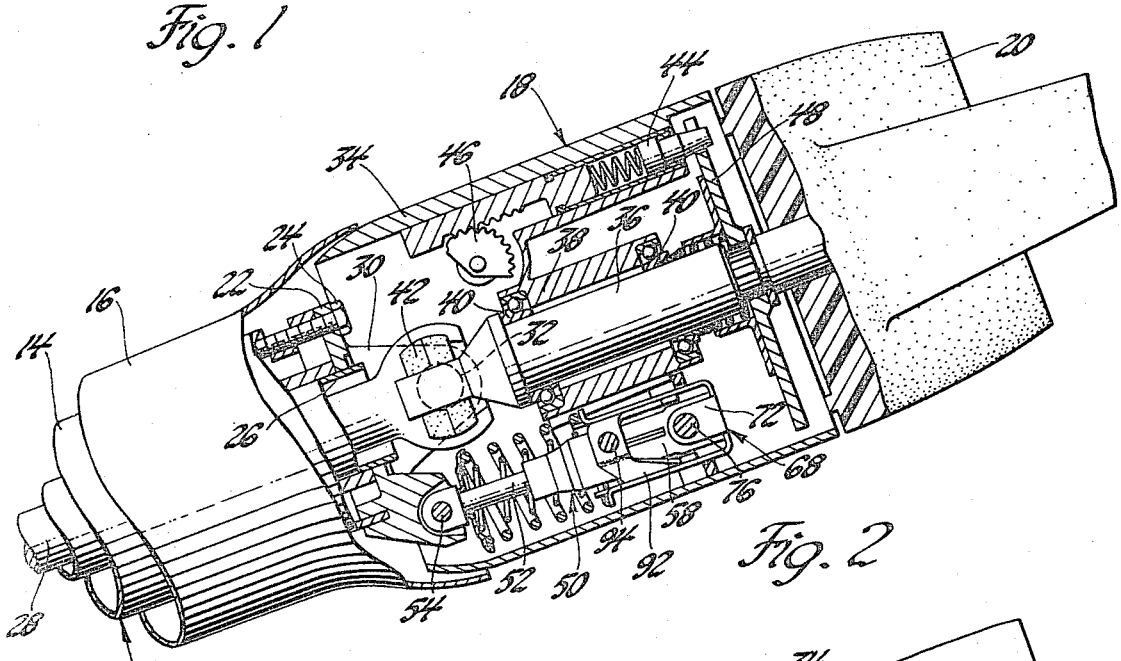
FIG. 2 is a partially broken away enlarged view of a portion of FIG. 1.

Referring to FIG. 2, the lower column section 12 including the mast jacket 14 is more particularly provided with a lower wheel support 22 of die cast or similar construction and shaped generally as an annulus suitable for mating with the upper end of the mast jacket 14 and securement thereto by self-tapping screws 24. The lower support 22 includes provisions for rotatably supporting within a central bore thereof the upper end of a shift tube assembly 26 rotatable as a unit with bowl 16 and connected with the usual transmission range selector apparatus for the purposes above indicated. A lower steering shaft 28 is in turn received rotatably within the shift tube 26 and extends to the vehicle engine compartment in well-known manner for connection to the vehicle steering gear, not shown.

Mounting ears 30 of the lower support 22 extend upwardly for securement therein of radially inwardly extending pivot pins 32, indicated in broken lines in both FIGS. 2 and 4, and which have inner ends thereof received within suitable journaling apertures of an upper wheel support 34 also of die cast or like construction. The pivot pins are, of course, aligned in a common axis which serves as the center of tilting adjustment of upper support 34 and wheel 20, as will appear. The steering wheel 20 is secured in conventional manner to an upper steering stub shaft 36 rotatably carried on an inner hub portion 38 of upper support 34 by suitable bearings 40. The upper end of steering shaft 28 and the lower end of stub shaft 36 are both bifurcated and relatively disposed with the spaced legs thereof in 90° angular relation with each other to commonly receive two mating generally hemispherical halves of a universal joint center unit 42 of plastic or like construction. This universal joint connection is well described in U.S. Pat. No. 3,167,971 to Zeigler et al., issued Feb. 2, 1965, and assigned to the assignee of the present invention, but it will be understood that the same provides connection between the two shafts in a manner operative to transmit torque therebetween yet permit free adjustment of the stub shaft 36 along with the steering wheel 20 and upper support 34, to various angular relationships in a vertical plane with the lower column section 12 and through the range of positions indicated by the broken lines in FIG. 1 for wheel 20.

The upper support 34 includes provisions for slidable mounting of a steering shaft lock bolt assembly 44 actuable by a rack and sector 46 connected with the usual column mounted vehicle ignition cylinder lock, not shown, so as to be engaged or disengaged in any of a number of peripheral notches in a keeper plate 48 splined to the stub shaft 36.

Figure 3:
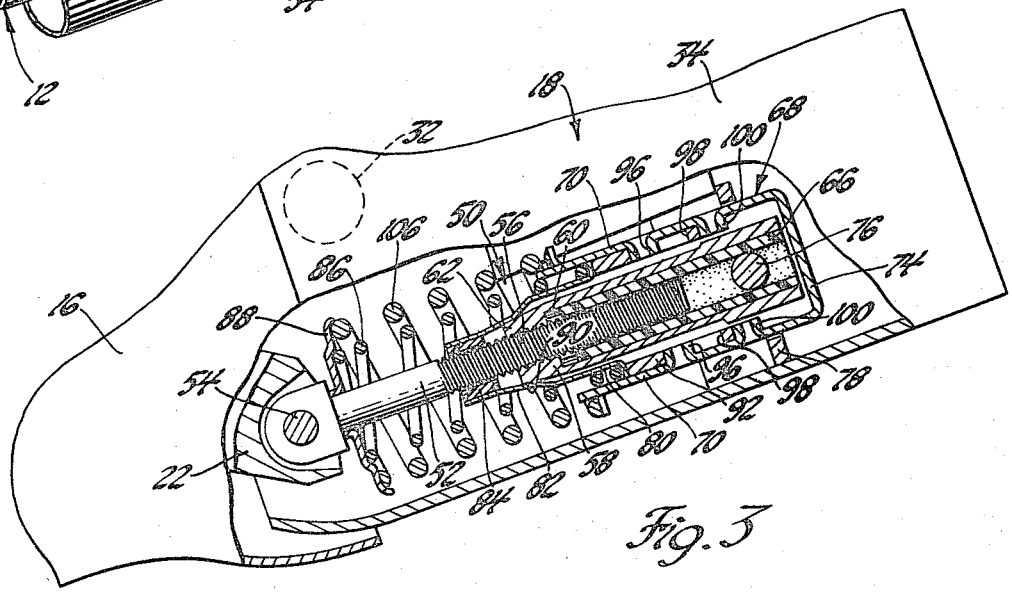
FIG. 3 is an enlarged view of a portion of FIG. 2 illustrating a preferred embodiment of the column latch structure.

An adjustment latch or lock assembly 50 is situated below and generally in the same vertical planes as the stub shaft 36 to provide positive latching of a selected position of steering wheel 20 in its range of tilting relative to lower section 12. Referring to FIG. 3, the latch includes a rod 52 having a lower end thereof pivoted at 54 on the lower support 22. The opposite end of rod 52 is disclosed as having a tooth conformation 56, more particularly a thread of a standard type such as ¼ – 48 UNS. It will be understood that alternatively, simple annular serrations may be provided instead of helical threads, or less preferably such end of the rod may be smooth. However, in the context as used herein, tooth means or tooth conformation should be understood to mean helical or nonhelical threads, ridges, ribs or serrations formed as annuli in a plane generally transverse the axis of the rod.

Such threaded end of the rod is received telescopically within a tubular collet 58, also indicated in FIGS. 7 and 8. The collet 58 is provided with angularly spaced longitudinally extending slots 60 defining fingers 62 terminating in end portions on the inner surfaces of which are formed threads 64 complementary to the threads 56. The collet may be formed from a suitable steel exhibiting resilience sufficient to enable limited flexing of the fingers 62 radially inwardly and outwardly under moderate force as will appear.

A thermoplastic or other polymeric material guide sleeve 66 coaxial within collet 58 antifrictionally receives the rod 52. A stamped metal holder 68 comprised of bent upper and lower legs 70 and bent side legs 72, all merging with a base 74, is received over a collet 58 and in its side legs includes aligned apertures registering with simiar aligned apertures in the collet and sleeve 66 to receive a pivot pin 76 which lies in semicylindrical depressions in a portion of the upper support hub 38 and over which is located a similarly locally depressed retainer plate 78, best viewed in FIG. 4, held by screws on the upper support. The assembly of parts joined by pin 76 is thus rotatably attached to the latter.

Further received over the lower end of collet 58 but within the confines of holder 68 is an actuating member 80 of generally cylindrical construction but including a conical section 82. The member 80 is slidable axially of the collet and includes a guide bushing 84 of material similar to sleeve 66 for guidance of such sliding movement also on rod 52. Member 80 is urged to a normal position, as indicated in FIG. 3, by a coil compression spring 86 seated between a holder or seat 88 on rod 52 and an annular flange at the upper end of the member 80. This upward bias normally places the cone 82 of such member in forcible engagement with taper surfaces 90 on the inner ends of fingers 62 so that the latter are cammed radially inwardly to engage threads 64 with threads 56. In such condition, the upper steering column section 18 is positively and securely latched against tiltable movement about the axis of pins 32 relative to lower column section 12.

Release means for the latch, indicated in FIGS. 3 and 5, include a release member 92 of stamped or bent U-shaped configuration, the base of which U has threadably secured therewithin the end of a manual actuating lever 94 which may extend radially outwardly through a suitable aperture in the upper support 34 to be grasped by the operator's fingers. Circular projections or posts 96 are punched inwardly of the legs 70 of holder 68 to be received in elongated slots 98 in the upper and lower legs of member 92 for retention of the latter in the holder, and similar posts 100 are punched inwardly of these same holder legs to lie in juxtaposition to arcuate camming surfaces 102 at the upper edges of such legs of the member 92, all as best seen in FIG. 5. Another pair of camming surfaces 104 at the lower edges of such legs of the member 92 are engaged under the spring pressure of spring 86 with the upper annular flange of actuating member 80 on which such spring bears. As illustrated in a comparison of FIGS. 5 and 6, the camming surfaces 102 are operative under operator caused upward tilting of lever 94 and member 92 about posts 96 to cause a simultaneous shifting movement of member 92 downwardly to the extent permitted by slots 98, and the camming surfaces 104 operate during such shifting to transmit such combined rotation and shifting into purely axial displacement of the actuating member 80 downwardly against the bias of spring 86. This removes cone portion 82 of the actuating member to the position indicated in FIG. 7 wherein it is seen that the fingers 64 are thereby permitted to assume a more natural or unstressed condition radially expanded to disengage the threads 64 and 56. The steering wheel 20, upper support 34, etc., constituting the upper steering column section 18, may thus be tiltably adjusted about the axis of the pins 32 to any selected condition whereupon the operator may release the lever 94 and the spring 86 will return the parts to the condition of FIG. 3 to positively lock the steering wheel in the selected position.

The latch arrangement also incorporates in a conveniently nested relation therewith an upper section biasing element in the form of a larger coil spring 106 enveloping spring 86 and also bearing at one end on the holder 88 and at its other end on tabs struck from the legs 70 of the holder 68. Spring 106 provides a bias tending to move the upper steering column section 18 upwardly against the gravitational force in the opposite direction, and thus assists the operator in his selected adjustment.

It will be appreciated that the length of the threads 56 on rod 52 fully contemplates the range of adjustment of steering wheel 20 as indicated in FIG. 1. It is also readily seen that with properly chosen fineness of thread, the upper steering column section may be adjusted to a great number of distinct positions rather than but six or seven positions, yet the locking achieved by the same is precise and it is all achieved with an economy of parts.

Having thus described the invention, what is claimed is:

1. In a steering column assembly including a lower section and an upper section movably mounted on said lower section for tiltable adjustment relative thereto generally in a plane, latch means for securing said sections in any selected one of a plurality of adjusted positional relationships comprising a rod pivotally secured at one end thereof to one of said sections and the other end thereof having a tooth conformation, a tubular collet secured to the other of said sections and coaxially receiving said other end of said rod, said collet having a plurality of longitudinal slots defining fingers radially contractible and expandable with respect to said rod, tooth means on said fingers engageable with said other end of said rod and a taper surface on each finger adjacent said collet and sildable over said taper surfaces in a direction to forcibly contract said fingers, means biasing said cone in said direction, and means manually operable to slide said cone in an opposite direction to permit expansion of said tooth means out of engagement with said other end of said rod, said manually operable means including a pivotable lever extending in a plane oriented transversely of the plane of tilting of said sections and means responsive to pivoting of said lever to overcome said biasing means and effect said sliding of said cone, whereby when said tooth means is disengaged from said other end of said rod said upper column section is freely adjustable relative to said lower section to a selected positional relation therewith and contraction of said tooth means into engagement with said other end of said rod holds said sections in said selected relation.

2. In a steering column assembly including a lower section and an upper section movably mounted on said lower section for tiltable adjustment relative thereto generally in a plane, each said section including a steering shaft portion and said shaft portions being connected for relative tilting in a plane, latch means for securing said sections in any selected one of a plurality of tiltably adjusted relationships comprising a rod pivotally secured at one end thereof to one of said sections and the other end thereof having a tooth conformation, sections and the other end thereof having a tooth conformation, a tubular collet pivotally secured to the other of said sections and coaxially arranged with said rod generally in said plane of tilting of said shaft portions and said collet receiving said other end of said rod, said collect having a plurality of longudinal slots defining fingers radially contactible and expandable with respect to said rod, tooth means on said fingers engageable with said other end of said rod and a taper surface on each finger adjacent said tooth means, an actuating cone coaxial with said rod and said collect and slidable over said taper surfaces in a direction to forcibly contract said fingers, a pair of coaxially arranged coil springs, one biasing said cone in said direction and the other biasing said upper section tiltably in one direction relative to said lower lection, and means manually operable to slide said cone in an opposite direction to permit relaxation of said tooth means out of engagement with said other end of said rod, said manually operable means including a lever extending for motion in a plane oriented transversely of said plane of tilting of said shaft portions, and cam means for converting said motion of said lever into said slidings of said cone and conversely, whereby when said tooth means is disengaged from said other end of said rod said upper column section is freely adjustable relative to said lower section to a selected positional relation therewith and contraction of said tooth means into engagement with said other end of said rod holds said sections in said selected relation.

3. In an assembly including a lower section and an upper section mobably mounted on said lower section for tiltable adjustment relative thereto generally in a plane, latch means for securing said sections in any selected one of a plurality of adjusted positional relationships comprising a rod pivotally secured at one end thereof to one of said sections and the other end thereof having a tooth conformation, a tubular collet secured to the other of said sections and coaxially receiving said other end of said rod, said collet having a plurality of longitudinal slots defining fingers radially contractible and expandable with respect to said rod, tooth means on said fingers engageable with said other end of said rod and a taper surface on each finger adjacent said tooth means, an actuating cone coaxial with said rod and said collet and slidable over said taper surfaces in a direction to forcibly contract said fingers, a pair of coaxially arranged coil springs, one biasing said cone in said direction and the other biasing said upper section tiltably in one direction relative to said lower section, and means manually operable to slide said cone in an opposite direction to permit expansion of said tooth means out of engagement with said other end of said rod whereby when said tooth means is disengaged from said other end of said rod said upper column section is freely adjustable relative to said lower section to a selected positional relation wherewith and contraction of said tooth means into engagement with said other end of said rod holds said sections in said selected relation.

* * * * *

PO-1050
(5/69)

UNITED STATES PATENT OFFICE
CERTIFICATE OF CORRECTION

Patent No. 3,851,543  Dated December 3, 1974

Inventor(s) Lynn C. Krom

It is certified that error appears in the above-identified patent and that said Letters Patent are hereby corrected as shown below:

Column 1, line 6, "ajustability" should read -- adjustability --; lines 53 and 54, "collect" should read -- collet --. Column 3, line 44, "simiar" should read -- similar --. Column 5, line 10, after "said" and before "collet" insert -- tooth means, an actuating cone coaxial with said rod and said --; lines 37 and 38, delete "sections and the other end thereof having a tooth conformation,"; line 47, "collect" should read -- collet --. Column 6, line 19, "mobably" should read -- movably --; line 45, "wherewith" should read -- therewith --.

Signed and sealed this 22nd day of April 1975.

(SEAL)
Attest:

RUTH C. MASON
Attesting Officer

C. MARSHALL DANN
Commissioner of Patents
and Trademarks